US009380273B1

(12) United States Patent
Jensen et al.

(10) Patent No.: US 9,380,273 B1
(45) Date of Patent: Jun. 28, 2016

(54) MULTIPLE APERTURE VIDEO IMAGE ENHANCEMENT SYSTEM

(75) Inventors: David W. Jensen, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1297 days.

(21) Appl. No.: 12/572,492

(22) Filed: Oct. 2, 2009

(51) Int. Cl.
*H04N 7/18* (2006.01)
*H04N 5/225* (2006.01)
*H04N 5/232* (2006.01)
*G06T 5/00* (2006.01)

(52) U.S. Cl.
CPC ............ *H04N 7/181* (2013.01); *G06T 5/001* (2013.01); *H04N 5/225* (2013.01); *H04N 5/2254* (2013.01); *H04N 5/23222* (2013.01)

(58) Field of Classification Search
CPC ... H04N 7/181; H04N 5/225; H04N 5/23222; H04N 5/2254; G06T 5/001
USPC ........................................ 348/218.1; 345/7–9
See application file for complete search history.

(56) References Cited

U.S. PATENT DOCUMENTS

| | | | |
|---|---|---|---|
| 5,808,589 A * | 9/1998 | Fergason | 345/8 |
| 6,320,979 B1 * | 11/2001 | Melen | 382/154 |
| 6,550,949 B1 * | 4/2003 | Bauer et al. | 362/545 |
| 6,781,606 B2 * | 8/2004 | Jouppi | G06T 3/4038 318/568.12 |
| 6,836,288 B1 * | 12/2004 | Lewis | H04N 5/2352 348/221.1 |
| 7,499,079 B2 * | 3/2009 | Evans et al. | 348/218.1 |
| 7,612,805 B2 * | 11/2009 | Solomon | G02B 27/0025 348/208.11 |
| 7,835,820 B2 * | 11/2010 | Peters, II | 700/245 |
| 7,916,180 B2 * | 3/2011 | Olsen et al. | 348/218.1 |
| 8,102,423 B2 * | 1/2012 | Cheng | 348/159 |
| 8,110,791 B2 * | 2/2012 | Laycock et al. | 250/227.2 |
| 8,385,971 B2 * | 2/2013 | Rhoads | G06F 17/30244 382/162 |
| 8,446,509 B2 * | 5/2013 | Jones | H04N 5/23238 348/333.03 |
| 2002/0030163 A1 * | 3/2002 | Zhang | 250/330 |
| 2002/0050518 A1 * | 5/2002 | Roustaei | G06K 7/10544 235/454 |
| 2003/0156425 A1 * | 8/2003 | Turnbull | B60L 1/14 362/545 |
| 2003/0184718 A1 * | 10/2003 | Childers et al. | 353/122 |
| 2004/0007750 A1 * | 1/2004 | Anderson et al. | 257/414 |
| 2005/0133810 A1 * | 6/2005 | Roberts et al. | 257/99 |
| 2006/0066730 A1 * | 3/2006 | Evans et al. | 348/218.1 |
| 2006/0072014 A1 * | 4/2006 | Geng et al. | 348/159 |
| 2008/0024594 A1 * | 1/2008 | Ritchey | H04N 5/2254 348/36 |
| 2008/0174670 A1 * | 7/2008 | Olsen et al. | 348/222.1 |
| 2008/0218611 A1 * | 9/2008 | Parulski et al. | 348/262 |
| 2009/0116688 A1 * | 5/2009 | Monacos et al. | 382/100 |
| 2009/0268983 A1 * | 10/2009 | Stone et al. | 382/284 |
| 2010/0060746 A9 * | 3/2010 | Olsen et al. | 348/222.1 |
| 2010/0200736 A1 * | 8/2010 | Laycock et al. | 250/227.2 |

(Continued)

*Primary Examiner* — Patrice Winder
*Assistant Examiner* — Angela Widhalm De Rodrig
(74) *Attorney, Agent, or Firm* — Angel N. Gerdzhikov; Donna P. Suchy; Daniel M. Barbieri

(57) ABSTRACT

Disclosed is a helmet mounted enhanced vision system which includes at least one camera, having a circuit board therein with an array thereon of closely spaced apertures, where each aperture includes an electronic light sensor and a computer die coupled to and associated therewith, such that each aperture behaves much like a digital camera coupled via to the other apertures by a network. The array of apertures each including varied sensor types such sensors having: different resolutions, distance to optimal focus point, and light sensitivity, so as to enable foveal displays, multi-focal point images and dynamic range enhancement, respectively.

9 Claims, 5 Drawing Sheets

(56) References Cited

U.S. PATENT DOCUMENTS

| | | | |
|---|---|---|---|
| 2011/0019032 A1* | 1/2011 | Pinsky | G06T 5/0009 348/238 |
| 2011/0026141 A1* | 2/2011 | Barrows | H04N 5/2254 359/737 |
| 2015/0085133 A1* | 3/2015 | Teich | H04N 5/332 348/159 |
| 2015/0103149 A1* | 4/2015 | McNamer | G06T 7/0075 348/50 |
| 2015/0358560 A1* | 12/2015 | Boulanger | H04N 5/332 348/164 |

* cited by examiner

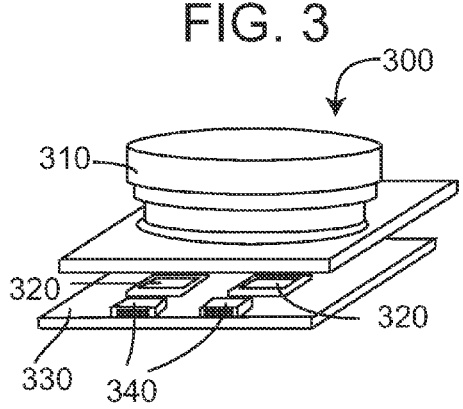
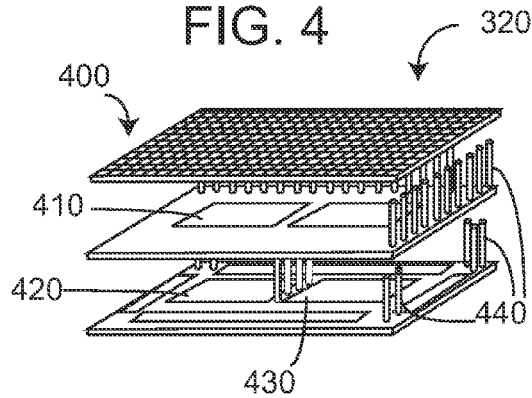

FIG. 8
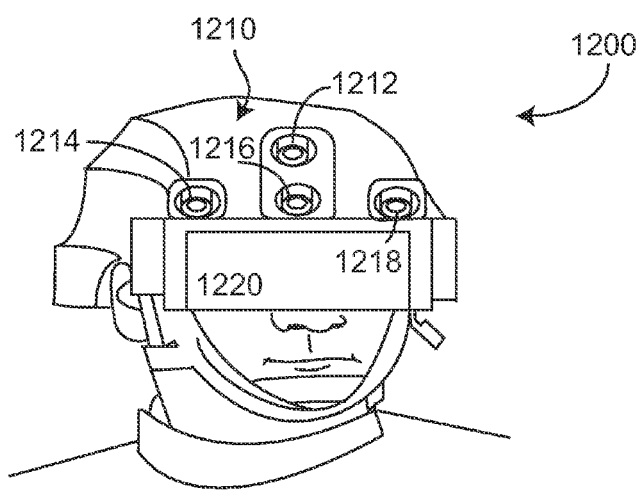
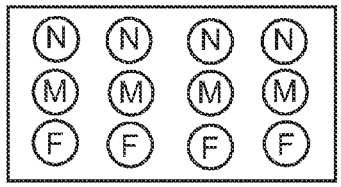
FIG. 9
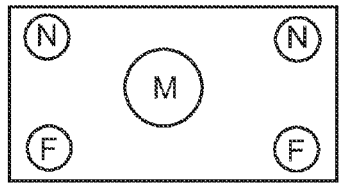
FIG. 10
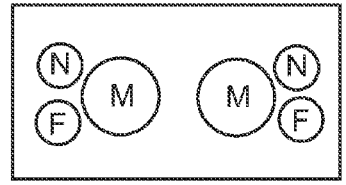
FIG. 11

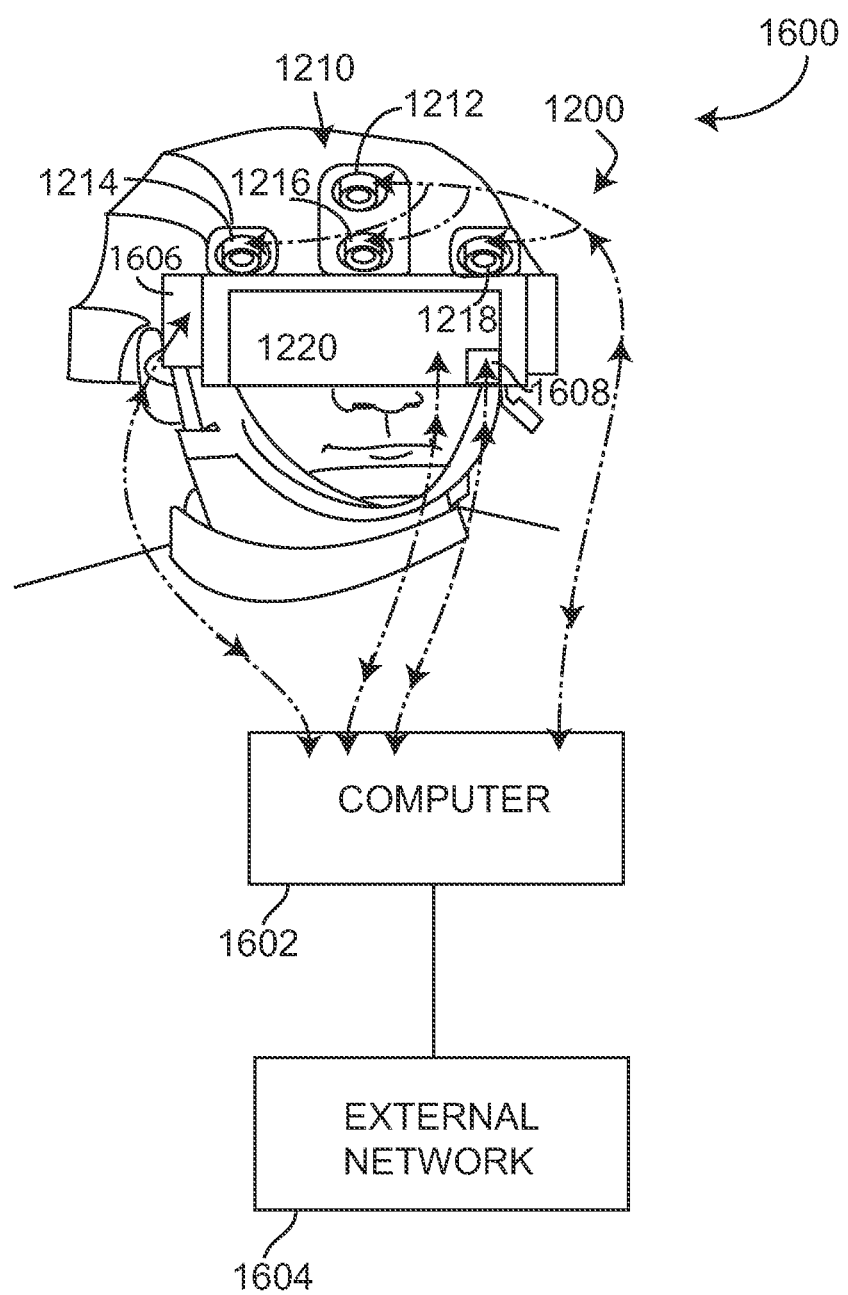

MULTIPLE APERTURE VIDEO IMAGE ENHANCEMENT SYSTEM

CROSS REFERENCE TO RELATED APPLICATIONS

This application relates to the following applications filed on even date herewith and each incorporated herein by these references in their entirety: Multiprocessor Discrete Wavelet Transform by John K. Gee, Jennifer A. Davis, David W. Jensen and James Potts, having U.S. patent application Ser. No. 12/572,600; Optical Helmet Tracking System by Jaclyn A. Hoke and David W. Jensen, having U.S. patent application Ser. No. 12/572,542; and
Custom Efficient Optical Distortion Reduction System and Method by David W. Jensen, Richard D. Tompkins and Susan Robbins, having U.S. patent application Ser. No. 12/572,669.

FIELD OF THE INVENTION

The present invention relates to image sensing and more specifically to systems and methods for utilizing multiple imaging sensors for digitally capturing a scene and combining images in an efficient manner to produce a superior image quality.

BACKGROUND OF THE INVENTION

In the past, images have been captured most often by a single image capture mechanism to produce a single image or a series of single images (video). Also, multiple cameras have been used to capture a wider field of view. For example, multiple cameras have been placed in a pod with the cameras being pointed radially outward and the resultant images, typically nature and landscape images focused on infinity, are fused to create a panoramic video. It has also been known to use multiple spaced apart sensors or cameras with the same sensing capabilities and a specialized display mechanism to provide for 3D imaging.

It has also been known in the past to use image fusion to merge digital images taken from multiple sensor types into one combined image. For example, aviation, military, police, security, and search and rescue operations have been known for years to utilize multi-spectral image fusion where an infrared sensor and/or other low light sensors are used in combination with other sensors to present a merged and enhanced image which displays all of the captured images.

Cameras and video cameras, even if used in groups, have certain well-known limitations. For example, in a typical camera, one must select a focus setting; i.e., a distance from the camera lens where the photographer wants the images to be in the best focus. Images farther than the focus setting will become increasingly blurry with additional distance. Objects closer than the optimal focus setting distance also become increasingly blurrier as the distance decreases. An individual's own eye can adjust to focus farther or nearer. However, a movie theater customer cannot do the same; they are stuck with the focus setting and optimal focus length selected by the camera operator during the making of the movie.

Another limitation of cameras is dynamic range, which is the ability to capture details nearby while in a shadow and still capture clouds in a bright sky in the background. Post-processing software exists, such as Photoshop Lightroom by Adobe Systems Incorporated, for merging together multiple shots carefully taken in series from a stable tripod and with different settings for light exposure levels. The multiple shots are merged in a way that captures the best image quality in each area.

Another limitation of cameras, and especially video cameras, is the image file storage sizes, and for live broadcasting, the computing processing resources needed to process high quality, high resolution (i.e., high definition video for live broadcasts).

The present invention overcomes some long-standing problems associated with optical images, especially when images are being processed at video rates, with high resolution, in environments with varied lighting, and of scenes having objects of interest both near and far.

SUMMARY OF THE INVENTION

The present invention provides for enhanced capabilities of image capturing and display systems.

It is an object of the present invention to improve the quality of images produced by camera and image capturing systems.

It is a feature of the present invention to include improved dynamic range enhancement characteristics.

It is another feature of the present invention to provide for multiple focus points in a displayed image.

It is yet another feature of the present invention to speed up processing of wide angle displays of video by providing a foveal view displayed to a solder wearing a helmet mounted display.

Accordingly, the present invention comprises: A method and system of displaying images comprising the steps of:

providing an array of a plurality of optically dissimilar apertures, where each aperture in said plurality of apertures comprises:
 an optical element;
 an electronic light sensor die, and
 a corresponding computing die, at least indirectly coupled with said electronic light sensor;
providing an electronic interface structure for at least indirectly communicating electronic image data from said array;
using a computer at least indirectly coupled to said array to receive electronic image data from said array and to process said electronic image data and to render display data to be displayed; and
providing a display device coupled to receive display data rendered by said computer.

BRIEF DESCRIPTION OF THE DRAWINGS

FIG. 3 shows a partially exploded and simplified system of the present invention.

FIG. 4 shows a partially exploded view of a portion of a system of the present invention.

FIG. 5 shows a schematic representation of a computing portion of the system of the present invention.

FIG. 8 shows portions of the present invention mounted on a helmet.

FIG. 9 shows a configuration of 3×4 array of apertures.

FIG. 10 shows a two-column array of apertures with an extra central aperture.

FIG. 11 shows an array of apertures with two sets of three apertures.

FIG. 12 shows a helmet mounted vision system of the present invention.

DETAILED DESCRIPTION

Figure 1:
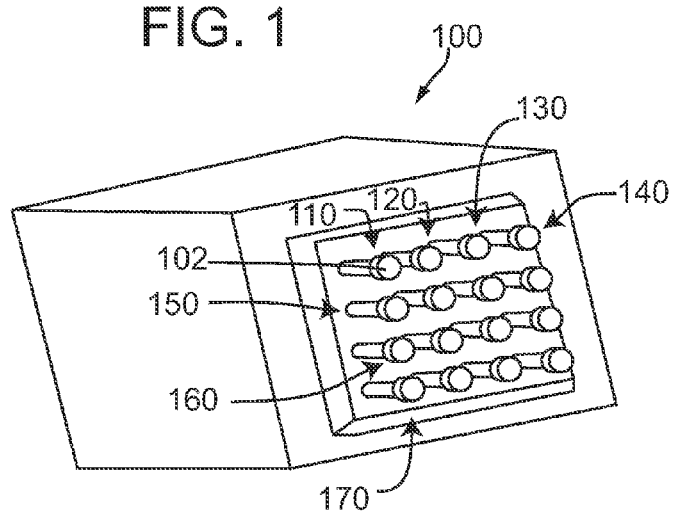
FIG. 1 shows a digital video imaging system of the present invention.

Now referring to the drawings, wherein like numerals refer to like matter throughout and more particularly, referring to FIG. 1, there is shown a multiple aperture sensor system (also referred to hereafter as MASS) of the present invention, generally designated 100 which includes a 4×4 array of apertures including apertures 110, 120, 130, 140, 150, 160 and 170. Each aperture may include a distally disposed optical element 102 which could be a lens, a filter, other optical attenuator, or a combination of the same. System 100 is a single assembly which includes lenses, sensors and computers for each of the apertures. It is known that a chip is also known as a die. Not shown is I/O interface connections which could be located anywhere, including the surfaces which are not visible in FIG. 1. Note: the term "aperture" is used herein in a manner which is consistent with the use of aperture when describing distributed aperture systems in the military. The term "aperture" is not intended to mean merely a hole through which light passes, as the term is often used with respect to photography.

Most digital cameras use a single lens assembly, and a single sensor (aperture), together with a single computer to capture and process images. The present invention is a system using multiple apertures, multiple sensors, and multiple computing modules to provide an improved image capturing system.

Figure 2:
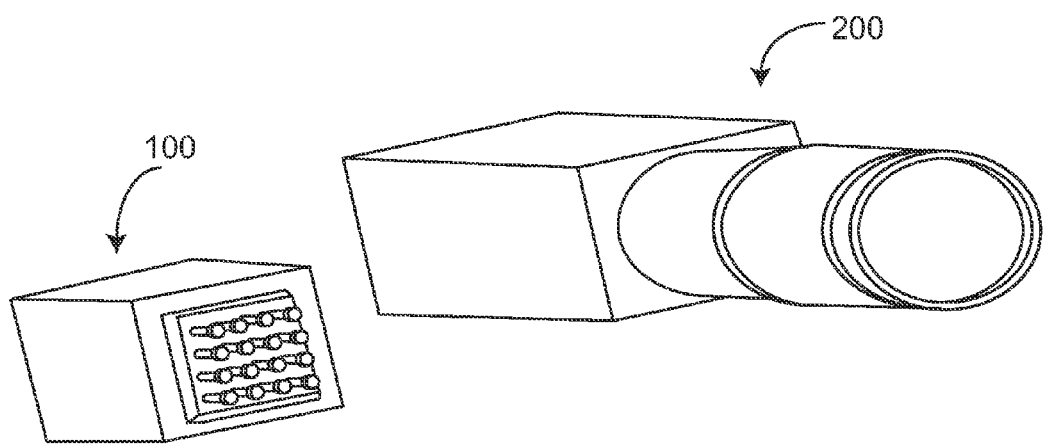
FIG. 2 shows a cartoon of a system of the present invention alongside a typical known prior art photographic or video imaging system.

The present invention has many benefits from replacing a single aperture system 200 with a MASS 100. One of the most obvious benefits is the reduction in size. Now referring to FIG. 2, there are shown two systems with similar optical and imaging capabilities. For example, the smaller lens assemblies of 100 reduce the weight and size. Smaller lenses are inherently lower cost than larger lenses and have fewer optical anomalies and distortions. Additionally, it has been shown that the lenses of the present invention can provide a better effective aperture and yet be able to reduce the number of lens elements in each aperture assembly.

The present invention replaces one large sensor with multiple smaller and very tightly packed sensors. This has the benefit of reducing the cost of the sensor; however, it does introduce a requirement of computing to merge the multiple small sensor images into a single larger image. It may be possible to produce larger composite images from multiple tightly packed sensors with the same or lower net sensor cost. Also, we note that multiple different types of sensors can be used in a system to provide additional benefits. As an example, using both low-light and normal light sensors could provide a user with a day-night imaging system. Cameras today provide significant computing processors to manipulate the large sensor data. A possible embodiment of the present invention may use multiple small microprocessors. Using many smaller processors provides scalability and power efficiency not attainable from a single large processor solution. One embodiment of the multiple aperture sensor system of the present invention can provide superior images in a smaller, lower cost system. This approach enables new capabilities not possible with a single aperture system. The following discussion provides some specifics on the implementation of the hardware, software and system of this multiple aperture sensor system. Throughout this description, we use the term "aperture" to embody not only the hole through which light enters a camera or imaging system, but also to include the lenses and mechanical housing. The multiple aperture sensor system, generally designated 300, uses three main sets of hardware: sensors, computing and optics. We show in FIG. 3 an illustration of those three components. The single imaging optical element (102 FIG. 1) i.e. attenuator and/or lens is represented by the cylinder 310 on the top. The sensor chips 320 are shown as black rectangles, disposed on a substrate 330. Note, in some embodiments. the sensor chips 320 would be packed as tightly together as possible, and might potentially be essentially seamlessly adjoined. The computing chips are below the sensors. The gold rectangles 340 represent electrical connectors for the system.

Now referring to FIG. 4, there are shown details for a dense connection scheme to package the sensor 320 and computing in close proximity. The diagram shows a small array 400 of pixels from a single aperture, including a sensor 320 on the top (optics are omitted). The system shows a pixel layer of 128×64 pixels each of which is 15 micrometers in width. These pixels are packed as closely together as possible and may come in many different individual pixel sizes and array sizes and configurations. The pixels may be individually addressable and controlled or may be controlled as a group. Sensor devices 320 typically use analog to digital (A/D) converters 410 coupled through a multiplexer (Mux) to provide the captured image data to a processor in usable form. We show the pixels connected vertically down to those converters 410, although other connection geometries are possible. The digital data is then routed down to a small computer (Micro-Core) 420 and stored in local memory 430. We also show inter-aperture communication paths to the North, West, South, and East. In one embodiment, those communication paths 440 or similar paths would connect to the gold connectors 340 in FIG. 3. The vertical stacking of optics, sensors, and computing allows for a very portable and mobile product support, such as helmet mounted sensors and small handheld devices.

In FIG. 5, possible core building blocks of the computing node for the present invention are shown. It is believed that a person possessing ordinary skill in the art, aided by this application, would be able to make and use the computing portion of the present invention.

One of the advantages of the multiple aperture sensor system 100 is the capability to support and process different types of sensors. This disclosure focuses on sensors for light (visible, low-light, and infrared). Many types of sensors exist to measure the intensity of the electromagnetic spectrum. The concepts protected by this disclosure are intended to apply to other spectrums and sensors as well, such as: acoustic, sonar, radio waves, X-ray, and gamma rays.

Commercial light detecting sensors are created from an assortment of materials. Common is the Charge Coupled Device (CCD), which implements an analog shift register that moves analog signals (electric charges) through successive capacitors under the control of a clock signal. These devices are typically created on silicon wafers and chips like many digital devices today. Also common is Complementary Metal Oxide Semiconductor (CMOS) sensor chips, which perform similar functions.

Both of these devices use arrays of small transistor devices to capture and convert light (photons) to an analog voltage. The voltages are measured and converted to digital images. Military and security forces use sensors for low-light (nighttime) operations. Such an image sensor is the Cypress LUPA-300 device (PN CYILI SM0300AA).

The multiple aperture sensor system will use multiple sensors. We envision configurations that use multiple sets of a single type of sensor. We also envision configurations that mix different types of sensors or different settings of similar or identical sensors. Sensor costs typically increase with size and with novel materials. Mixing small low-cost sensors with expensive large sensors can provide a more cost-effective solution for some systems. It is also recognized that combining the output of expensive infrared sensors with low-cost conventional image sensors can produce a lower cost system with enhanced imagery. We discuss these concepts and configurations in a following software section. With algorithm enhancement and correction routines, the MASS system 100 produces better images than a single aperture system. Scalable low power computing is important to produce an embedded MASS system 100. It is believed that it may be beneficial to use multiple microcoded engines to provide the desired performance of some of the future envisioned multifunction embedded products.

Digital cameras typically use a single aperture to capture light and images one at a time. There are many software algorithms to process those images. Some software algorithms exist to stitch multiple overlapping images into a single panoramic image. Some prior art software algorithms exist to combine images with different exposure times into a single high dynamic range image. It is believed that these image processing algorithms, which traditionally process single images or process multiple images taken over time, can benefit from processing images taken simultaneously with the multiple aperture sensor system 100. An example benefit is the concurrent capture of multiple images which enables real-time video enhancement. Another example is capturing lower light images by combining results from multiple sensors. Of course, one must address well-known issues, such as different resolution and registration when combining results from different sensors. However, these issues are easier with multiple tightly spaced apertures than with multiple images captured at different time. A broad set of algorithms may be desirable to support the multiple aperture sensor system 100. This algorithm typically combines a sequence of images to produce a higher resolution image than the original images in the sequence. Combining images captured simultaneously avoids issues such as motion blurring.

The super resolution concept of the present invention enables the use of multiple lower resolution, less expensive sensors to replace a single high resolution expensive sensor. Additionally, the present invention could include a multi-aperture sensor system 100 where the central apertures in an array are relatively high resolution and those around the periphery are lower resolution. This would mimic the fovea characteristic of the human eye where only the area around the central area of focus has high resolution and the peripheral vision areas are much lower because the eye will not perceive the detail even if displayed. This helps conserve computing resources, power and battery consumption, heat generation, etc. For example, in FIG. 1, the four central apertures under apertures 120 and 130 and in the same rows as aperture 150 and 160 would be high resolution and all others would be lower resolution. This may be most beneficial in applications such as shown in FIG. 8 below where the video data captured by the sensors is dependent upon the direction the helmet is pointed (especially if eye tracking is also used) and it is displayed to one person in real time. In such examples, there is no need to provide high resolution data in the peripheral vision of the viewer, since it will not be perceived by the viewer.

Similarly, multiple focus distance displays and photographs can be generated by utilizing sensors within one aperture that have substantially different predetermined optimal lens to image focus distances.

Likewise, dynamic range enhancement can be achieved with the use of sensors within an aperture that have substantially different light exposure sensitivity.

It is within ordinary skill in the art (after reading the disclosure of the present invention) to process many of the aforementioned algorithms. This framework transforms the image to a frequency domain. In an exemplary embodiment, a Le Gall 3/5 Discrete Wavelet Transform (DWT) may be used. This performs a reversible transformation to a low frequency and high frequency mapping. The low frequency map improves searching algorithms such as registration and feature recognition. The high frequency map improves algorithms that reduce noise and enhance detail in images. It is only necessary to perform the transformation once when using a DWT framework for multiple algorithms. Following the enhancement algorithms applied to the frequency domain data, a single transformation converts the data back to a normal image. The Le Gall 3/5 DWT is used in the JPEG 2000 compression algorithm. Another method which could be utilized is described in the above cross-referenced application filed by John Gee et al, filed on even date herewith and bearing U.S. patent application Ser. No. 12/572,600.

The Discrete Wavelet Transform (DWT) can be represented with both spatial and frequency representations. The DWT provides for multiple passes of encoding and is completely reversible. The transform processes entire rows and columns into low frequency and high frequency components. The low frequency data retains the essential image information and is shown in the upper left corner of the images. The high frequency coefficients are stored in the other three quadrants and represent areas of rapid change between adjacent pixels. Each pass of the DWT is recursively applied to the low frequency portion of the data of the previous pass. A DWT framework may provide a representation of the image that enables efficient processing of many image algorithms. As noted above, the low frequency representation enables faster searching and feature identification. The high frequency representation enables efficient noise reduction and feature enhancement. Additional examples based on this framework are discussed below. One example illustrates a technique for hand-free or continuous focus using multiple images captured at different focus depths, which is a key aspect of the invention. The apertures of the multiple aperture sensor system 100, could be divided so that some are focused at a close range, while others are focused at a mid range and others at a long range. The best focused segments of the objects visible in of each of these images are then combined into a single view that renders essentially every object visible in the image in focus. Also key to the present invention is a technique for combining multiple images captured at different exposure times to provide a high resolution image. The DWT framework is also applicable to dynamic range compression, where for example a high bit-depth image is displayed on a relatively lower bit depth display.

Figure 6:
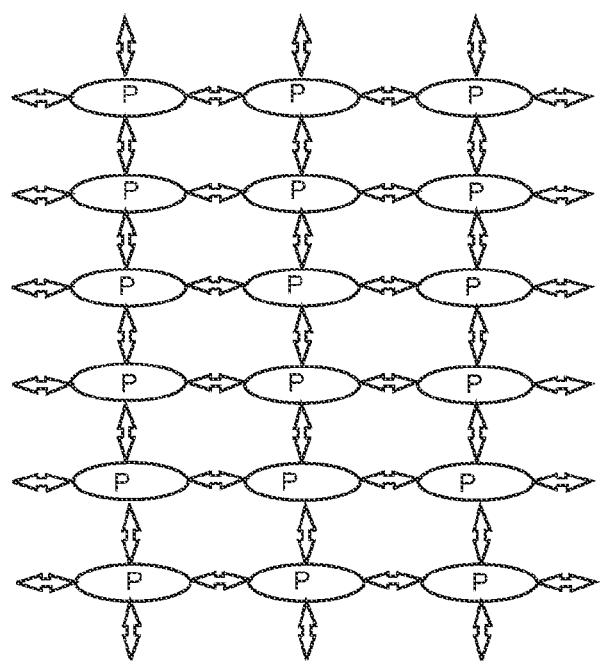
FIG. 6 shows a graphical representation of nodes in a communication network of the present invention.

FIG. 3 describes a multiple aperture sensor system 100 enabled through a networked set of computing, sensor, and optic nodes. In an exemplary embodiment, a node with its three main hardware components (sensors, computing, and optics) is shown. FIG. 6 shows how twelve such nodes may be connected to form a simple mesh network. Each node communicates with its nearest four neighbors using a north, west, east, and south communication port (labeled P).

Figure 7:
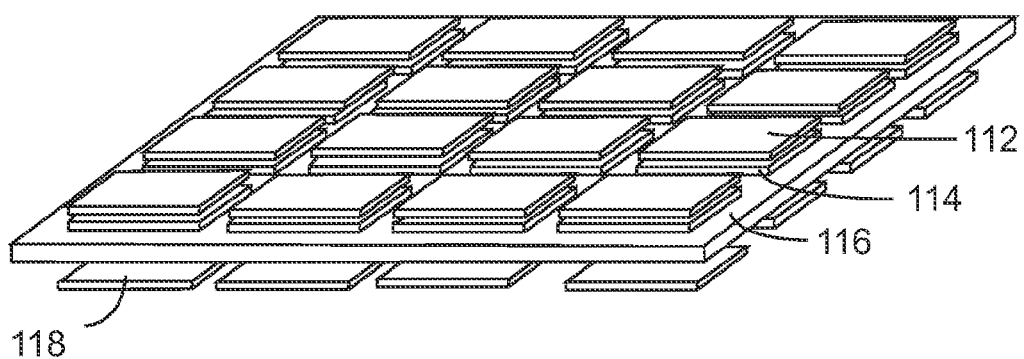
FIG. 7 shows a circuit board, optical, and computing assembly of the present invention.

We illustrate in FIG. 7 a prototype board, generally designated 1100, of approximated 41 mm×41 mm size containing a 4×4 grid of nodes. The inter-die gaps are shown at approximately 3 mm with 8 mm×8 mm die size. Each node has an image sensor 112 on the top and a computing device (FPGA) 114 underneath. Each node has an external memory module (RAM) 118 on the back side of the printed circuit board 116. Note: it generally is preferred to minimize the inter-die gap as much as possible. In many of the applications of the present invention, much benefit is received by having the apertures as closely packed as practically possible.

The Multiple Aperture Sensor System 100 provides size, weight, and power benefits for image sensing and processing products. It is expected that there will be an assortment of variants of the system 100 for use on vehicles compared to battery powered mobile systems. Different variants will be used for other sensor systems to support non-visible applications, such as acoustic, sonar and radar. Sensor types and computing will drive the power requirements. The design of the MASS node can include a single aperture or multiple apertures per node. In FIG. 3, we show a node with a single optics assembly 310, four sensors 320 (only two shown), and four computing devices 340 (only two shown). The simplest node would have a single optics assembly, a sensor, and computing device. Variants with multiple optics assemblies, prisms, mirrors, sensors, and computing devices are also envisioned. We show in FIG. 8 an application of the MASS concept for an Advanced Combat Helmet. This MASS includes four aperture nodes. As an example, the two center nodes could be infrared and low light sensors. The two edge nodes are high resolution visible light sensors. The computing combines the four sensor images to provide the soldier with a wide panoramic day/night view of his environment.

The Multiple Aperture Sensor System configuration shown in FIG. 8 for the Advanced Combat Helmet is just one of hundreds of potential configurations. Each configuration produces different results when evaluated for system weight, size, cost, power, field-of-view, and resolution. We recognize there are many parameters to consider in the design of a MASS helmet. These parameters include the number and positions of cameras, the resolution per camera, the algorithms, and the sensor types. We illustrate in FIGS. 9-11 three example configurations for such MASS systems. In those figures, each of the aperture nodes is labeled Near (N), Medium (M), or Far (F) for different focus depths. These labels could alternatively represent different exposure sensitivities. The size of the node could indicate the resolution of the sensor or different sensor types such as UV, IR, and Ea It is expected that various different MASS configurations could be conceived. It is possible to consider many configurations with 3, 4 and 5 cameras positioned over various field of views. The number of rows of cameras or nodes can be varied. As noted above, different resolutions, exposure times, and sensor types increase the number of potential configurations. We also note that an extra camera in the rear of the helmet could provide the soldier with additional situation awareness not available in current systems.

Now referring to FIG. 12, there is shown a helmet-mounted vision system of the present invention generally designated 1600, including a helmet system 1200 of FIG. 8, which includes an array 1210 of cameras, 1212, 1214, 1216 and 1218 which are coupled to each other and to a computer 1602 which is coupled to an external network 1604. Also shown is helmet tracking system 1606 and eye tracking system 1608, both of which are well known in the art. Also shown is a display device 1220 which is configured to display the image data which has been captured by the array 1210 of cameras and rendered by the computer 1602 or by one of the computing die in one of the camera apertures.

It will be further appreciated that functions or structures of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such a feature may be combined with one or more other features of other embodiments for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

We claim:

1. An electronic vision system comprising in operative combination:
   a support, configured to be worn;
   a plurality of apertures, disposed on said support, where each aperture of said plurality of apertures comprises:
      an electronic light sensor die configured to generate electronic image data and an internal to an aperture computing die configured to receive the electronic image data from said electronic light sensor die; and
      a mesh network segment configured for at least indirectly interconnecting said aperture to a nearest neighboring aperture;
   a computer coupled to said plurality of apertures and configured to receive a first electronic image data including a first region of a scene having overexposed pixel samples from a first aperture of the plurality of apertures and a second electronic image data including the first region of the scene having no overexposed pixel samples from a second aperture of the plurality of apertures and to combine the first and second electronic image data and increase a bit-depth of the pixel samples to render display data including an enhanced image of the first region of the scene having no overexposed pixel samples to be displayed;
   a display device, disposed on said support, and coupled to receive display data rendered by said computer;

said display device being configured to display visual images of said display data; and said computer is one of said computing die of one of said apertures configured to display visual images of said display data to only one person at any time, where said only one person is a person wearing said support.

2. The vision system of claim 1 wherein at least one of said apertures has an optical characteristic which is not the same as another of said plurality of apertures, where the optical characteristic is a non image resolution characteristic.

3. The vision system of claim 2 wherein the support is head-mounted.

4. The vision system of claim 1 further comprising a circuit board upon which is disposed, in an array, said plurality of apertures and wherein said electronic light sensor die and said internal to an aperture computing die are arranged in a stacked configuration.

5. The vision system of claim 1 wherein said computer further comprises a port to an external network and further comprising: an analog to digital convertor disposed between said internal to an aperture computing die and said electronic light sensor die.

6. The vision system of claim 1 wherein said computer is configured with software to render image data to display a foveated image where a central region of said foveated image has a higher resolution than a peripheral region of said foveated image;

with respect to at least one of said plurality of apertures, a fovea aperture disposed centrally in said a plurality of apertures; which outputs an image signal having a higher resolution characteristic than a peripheral aperture, which is disposed in a non-central location in said plurality of apertures.

7. The vision system of claim 1 wherein said first aperture and said second aperture are separate and distinct apertures with at least one different optical characteristic.

8. The vision system of claim 7 further comprising a circuit board upon which is disposed, in an array, said plurality of apertures:

wherein said computer is further configured with software to combine regions of a scene that are in focus in different aperture generated images, into a single enhanced image.

9. The vision system of claim 8 wherein said computer is configured with software to render image data to display a foveated image where a central region of said foveated image has a higher resolution than a peripheral region of said foveated image;

with respect to at least one of said plurality of apertures, a fovea aperture disposed centrally in said a plurality of apertures; which outputs an image signal having a higher resolution characteristic than a peripheral aperture, which is disposed in a non-central location in said plurality of apertures.

* * * * *